Jan. 13, 1925.　　　　　　　　　　　　　　　1,523,338
E. A. BARNES
METHOD OF MANUFACTURING FULMINATE OF MERCURY
Filed April 3, 1922
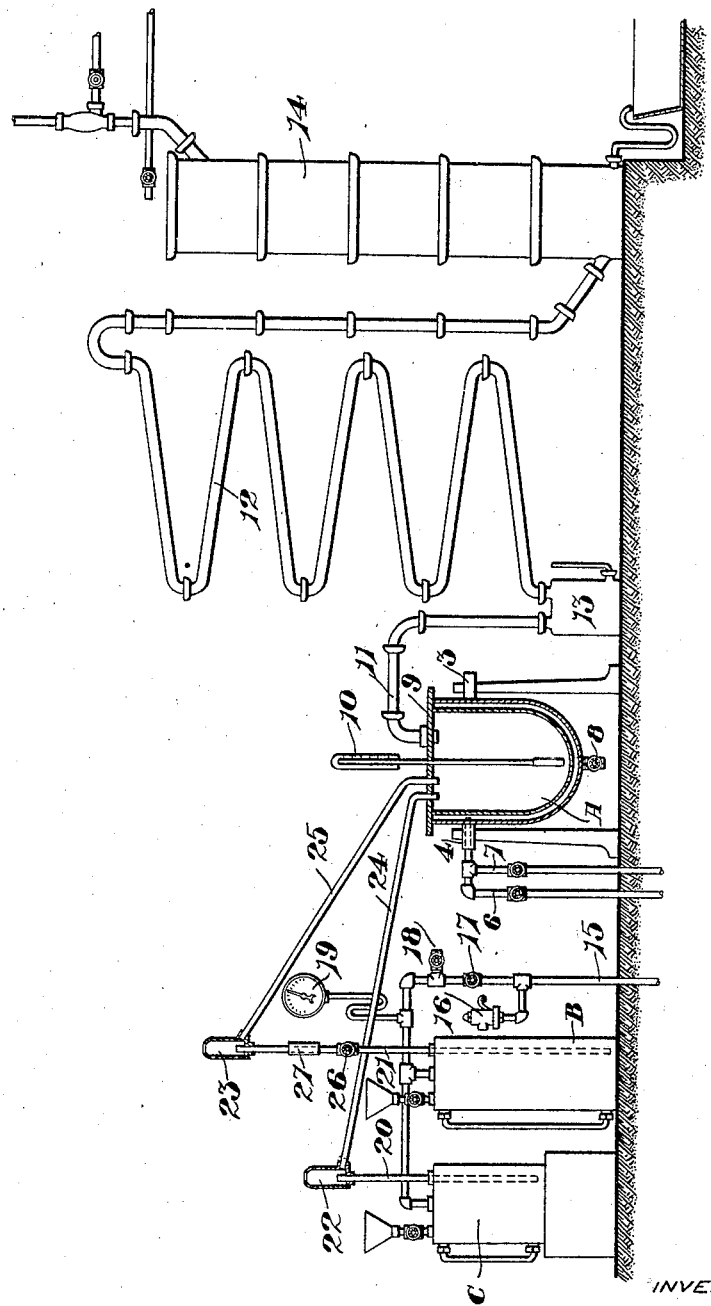
INVENTOR
EDWARD A. BARNES.
BY Dewey, Strong,
Townsend and Loftus
ATTORNEYS.

Patented Jan. 13, 1925.

1,523,338

UNITED STATES PATENT OFFICE.

EDWARD A. BARNES, OF OAKLAND, CALIFORNIA, ASSIGNOR TO CALIFORNIA CAP COMPANY, OF OAKLAND, CALIFORNIA, A CORPORATION OF CALIFORNIA.

METHOD OF MANUFACTURING FULMINATE OF MERCURY.

Application filed April 3, 1922. Serial No. 548,921.

*To all whom it may concern:*

Be it known that I, EDWARD A. BARNES, a British subject, residing at Oakland, county of Alameda, and State of California, have invented new and useful Improvements in Methods of Manufacturing Fulminate of Mercury, of which the following is a specification.

This invention relates to a method of manufacturing fulminate of mercury.

Since the year 1800, when Howard invented fulminate of mercury, but little progress has been made in its manufacture. The manufacture of fulminate is performed today in almost the same manner as that employed fifty years ago.

In Liebig's process and Chevalier's modification of it, as used in France, a solution of mercury in nitric acid is employed cold. In Chandelons' process it is used warm. Chandelons' process is the one most generally employed and original proportions of mercury and acid are closely adhered to, to-wit, one part by weight mercury is dissolved in ten parts by weight of nitric acid (specific gravity 1.4). This solution at a temperature of fifty-five degrees centigrade is poured into a capacious flask containing 8.3 parts alcohol (specific gravity .83). The type of flask employed has at least a capacity six times that of the liquids and it is usually connected with a stoneware condenser to recover spirit. After the solution of mercury and nitric acid is poured into the alcohol, reaction commences in about fifteen minutes and the reaction becomes very violent; the violence of the reaction being checked by the addition of fresh alcohol. As already stated the reaction is violent and in order to obtain a satisfactory yield, the manufacture must be carried out on what might be termed a laboratory scale; only about three pounds of fulminate being produced at a time. In some factories the alcohol is added to the nitrate, at others the reverse procedure is adopted, but in no case is more than three pounds of fulminate made at a time owing to the violence of the reaction. This necessitates the handling of several hundred pots or flasks daily; it being quite usual to make from fifteen hundred to two thousand pounds daily.

The present invention relates to improvements in the manufacture of fulminate of mercury. The object is to control the violence of the reaction which has hitherto necessitated the production of this material in very small quantities, owing to the impracticability of taking care of the enormous volume of poisonous and inflammable gases liberated in the space of a few minutes.

The invention also describes an apparatus and method of proportioning and mixing the reagents so that reaction proceeds at a constant and regular rate, whereby all difficulty in condensation is overcome and scale of operation and quantity of fulminate produced is only limited by the feasibility of handling the finished product.

The accompanying drawing is a diagrammatic view of the apparatus employed and the arrangement thereof.

Referring to the drawing in detail, A indicates a reaction vessel or container which in this instance is jacketed as indicated at 2 to permit heating or cooling thereof. The reaction vessel as a whole is supported by trunnions 3 and 4, between standards 5 of suitable construction. One of the trunnions, or that indicated at 4, is hollow to permit a pair of pipes 6 and 7 to pass therethrough, both pipes communicating with the jacket space 2. Both pipes are provided with valves as shown, hot water or steam being delivered by one pipe when it is desired to heat the vessel, and cold water being delivered by the other pipe if it is desired to cool the vessel. The heating or cooling medium thus applied may be continuously circulated and drained in any suitable manner, or as here shown by a drain cock 8 which may be partially opened to regulate the flow therethrough. The reaction vessel is otherwise provided with a removable cover 9, which supports a thermometer 10 of suitable construction. The cover is in this instance connected through means of a pipe 11 with a condenser 12 of suitable construction, a trap 13, and a scrubber or tower 14.

One of the important features of the present invention is the continuous delivery of predetermined proportions of alcohol and a solution of mercury and nitric acid. This is accomplished in the following manner:

B indicates a tank for the reception of alcohol, and C a tank for the reception of a solution of nitric acid and mercury. The liquid contained in each vessel is subjected to air under pressure which is delivered by means of a pipe 15; this pipe being provided with a safety valve 16, a feed valve 17, a blow off valve 18 and a pressure gauge 19. Each tank is provided with liquid level indicating gauges as shown and with discharge pipes as indicated at 20 and 21, respectively. The upper ends of these pipes deliver the respective liquids into receivers 22 and 23, which are open to the atmosphere and the liquid is drained therefrom by gravity by means of pipes 24 and 25, which delivers the liquid to the reaction vessel as shown.

By referring to the drawing it will be noted that the receivers 22 and 23 are elevated with relation to each other. This is due to the difference in specific gravity between the liquids employed and furthermore provides a simple method of proportioning the amount of liquid delivered by each of the pipes 24 and 25. The vertical pipe 21 is also provided with a proportioning feed valve 26, which permits further regulation or proportioning of the liquids, and a telescoping connection 27 is provided to permit vertical adjustment of the receiver 23.

In actual operation the reaction vessel is heated to a temperature, preferably not exceeding eighty-five degrees centigrade, by circulating hot water or steam through the jacket of the vessel in the manner previously described. The reagents, to-wit, the solution of mercury and nitric acid, together with the alcohol, are thereupon fed in separate continuously flowing streams to the vessel and predetermined proportions are maintained. Reaction between the liquids is completed almost immediately as they combine or mix, and the gases liberated by the reaction are removed and condensed as fast as they are formed, that is as the liquids are entering in continuous separate streams and do not mingle or react with relation to each other before they enter the vessel, it is obvious that the reaction will be continuous and uniform, and that the proportion or volume of gases liberated will similarly remain constant. By regulating the feed of the liquids, the temperature can be maintained at approximately eighty-five degrees centigrade throughout the entire reaction, and when the supply of liquids is cut off, cessation of fumes will denote completion of reaction. At this point the heating medium is cut off and the vessel is cooled to approximately fifteen degrees centigrade, when the contents of the vessel can be discharged by tilting, that is after the cover and the several connections formed therewith are removed. Any other method may be employed for discharging the vessel. The yield of fulminate is substantially one hundred and twenty-five per cent and has a purity of substantially ninety-eight per cent. By one hundred and twenty-five per cent yield I mean that for each one hundred pounds of mercury employed I obtain substantially one hundred and twenty-five pounds of fulminate.

Another important step of the present invention is the recovery of oxalic acid from the waste liquids; this step of the process being covered by a divisional application entitled Method of recovering oxalic acid, filed January 2, 1923, Serial No. 610,365. The residual liquors resulting from the process of manufacture of fulminate of mercury contain a large proportion of glycolic acid, together with free nitric acid. This liquor is filtered and placed in an evaporator where it is reduced to approximately one-eighth its original bulk, any suitable type of evaporator being employed. Oxidation of the glycolic acid to oxalic acid takes place during evaporation and the oxalic acid crystallizes out in well formed crystals when the liquor is cooled. The crystals are then filtered out and by washing the same with a small amount of water, preferably in a centrifugal, by means of a spray, all adhering impurities are removed and a product substantially ninety-nine and one-half per cent pure is obtained without further recrystallization. Further concentration of the mother liquors will yield a small amount of oxalic acid more or less impure. The yield of oxalic acid from the first crystallization is from thirty to forty per cent of the fulminate produced and it is obviously a considerable item when working on a large scale.

When combining the reagents during the process of manufacturing the fulminate, it should be clearly understood that the violence of the reaction and the volume of inflammable and poisonous gases liberated are entirely dependent upon the quantity of liquids introduced or acted upon at a time. The greater the quantity of liquids, the greater the volumes of gases liberated and the greater the violence of the reaction. It is for this reason that it has heretofore been practically impossible to produce more than three pounds of mercury at a time. By the present method practically any quantity of fulminate can be produced, as large quantities of the respective liquids are gradually combined, as stated, thereby providing a simple control of the reaction, or in other words the violence thereof, and further permitting complete removal and condensation of the gases liberated. The residual liquors obtained from the process may be further treated to remove the oxalic acid, as stated, and a valuable by-product is thus obtained which has heretofore been considered a waste. Another valuable feature of the present process is the fact that the gases evolved, whether poisonous, inflammable or otherwise, may be taken care of by a suitable form of condenser and scrubber, and as such is the case liberation into the atmosphere and destruction of surrounding vegetation may be entirely avoided.

In the drawing accompanying the present application I have shown two tanks, one for the reception of a solution of mercury and nitric acid, and the other for the reception of alcohol. I wish it understood that the liquid contained in these tanks may be maintained under any desirable temperature. I further wish it understood that these solutions may be combined or mixed before delivery to the reaction vessel, but if this is the case the mixed solution must be kept at a cold temperature to avoid reaction before admission to the reaction vessel.

Having thus described my invention, what I claim and desire to secure by Letters Patent is:—

1. A method of manufacturing fulminate of mercury which consists in gradually combining a solution of mercury and nitric acid and alcohol by delivering the same in separate continuously flowing streams to a reaction chamber.

2. A method of manufacturing fulminate of mercury which consists in gradually combining a solution of mercury and nitric acid and alcohol by delivering the same in separate continuously flowing streams to a reaction chamber, and maintaining predetermined proportions of the liquids delivered.

3. A method of manufacturing fulminate of mercury which consists in gradually combining a solution of mercury and nitric acid and alcohol by delivering the same in separate continuously flowing streams to a reaction chamber, maintaining predetermined proportions of the liquids delivered, and maintaining the liquids undergoing reaction under a constant predetermined temperature.

4. A method of manufacturing fulminate of mercury which consists in gradually combining a solution of mercury and nitric acid and alcohol by delivering the same in separate continuously flowing streams to a reaction chamber, maintaining predetermined proportions of the liquids delivered, and subjecting the liquids undergoing reaction and maintaining said liquids at a temperature of substantially eighty-five degrees centigrade.

EDWARD A. BARNES.